(12) United States Patent
Galbiati

(10) Patent No.: US 11,400,415 B2
(45) Date of Patent: Aug. 2, 2022

(54) HIGH LENGTH ISOTOPES SEPARATION COLUMN AND METHOD FOR ASSEMBLY

(71) Applicant: Cristiano Galbiati, Carloforte (IT)

(72) Inventor: Cristiano Galbiati, Carloforte (IT)

( * ) Notice: Subject to any disclaimer, the term of this patent is extended or adjusted under 35 U.S.C. 154(b) by 366 days.

(21) Appl. No.: 16/604,169

(22) PCT Filed: Apr. 13, 2018

(86) PCT No.: PCT/IB2018/052581
§ 371 (c)(1),
(2) Date: Oct. 10, 2019

(87) PCT Pub. No.: WO2018/189717
PCT Pub. Date: Oct. 18, 2018

(65) Prior Publication Data
US 2020/0114312 A1    Apr. 16, 2020

(30) Foreign Application Priority Data
Apr. 14, 2017   (IT) .................. 102017000042150

(51) Int. Cl.
*B01D 59/04* (2006.01)
*B01D 3/32* (2006.01)
*B01D 3/42* (2006.01)

(52) U.S. Cl.
CPC .............. *B01D 59/04* (2013.01); *B01D 3/32* (2013.01); *B01D 3/4211* (2013.01); *F25J 2220/90* (2013.01)

(58) Field of Classification Search
CPC ......... B01D 3/32; B01D 3/4211; B01D 59/04
See application file for complete search history.

(56) References Cited

U.S. PATENT DOCUMENTS

| | | | | |
|---|---|---|---|---|
| 3,750,413 A | * | 8/1973 | Milligan | F25J 3/0252 62/298 |
| 4,872,955 A | * | 10/1989 | Parker | B01D 3/20 202/154 |
| 6,711,868 B1 | * | 3/2004 | Faure | F25J 3/0489 52/745.17 |
| 6,875,406 B1 | * | 4/2005 | Hubinger | B01D 3/225 422/144 |
| 7,238,773 B2 | * | 7/2007 | Huebinger | B01D 3/22 528/500 |
| 10,343,081 B2 | * | 7/2019 | Porta | B01D 1/08 |

(Continued)

FOREIGN PATENT DOCUMENTS

| | | |
|---|---|---|
| DE | 3219456 A1 | 12/1983 |
| EP | 0913655 A1 | 5/1999 |

(Continued)

OTHER PUBLICATIONS

Espacenet JPH1163808A Patent Machine Translation obtained Dec. 13, 2021. (Year: 2021).*

*Primary Examiner* — Jonathan Miller
(74) *Attorney, Agent, or Firm* — Rumit Ranjit Kanakia

(57) ABSTRACT

The present invention relates to the field of distillation of isotopes obtained by distillation columns. An object of the present invention is to describe an innovative distillation column which provides significant improvements to the prior art. In particular, the distillation column will be a modular innovatively conceived column having any needed height.

13 Claims, 3 Drawing Sheets

(56) References Cited

U.S. PATENT DOCUMENTS

2001/0018829 A1* 9/2001 Wagner ................ F17C 13/083
                                                             62/54.3
2009/0188181 A1* 7/2009 Forbis ...................... E04B 1/92
                                                            52/173.1
2011/0061224 A1* 3/2011 Ludwig .................... B01D 3/02
                                                            29/592.1

FOREIGN PATENT DOCUMENTS

| GB | 525575 A | 8/1940 |
| JP | H1163808 A | 3/1999 |
| WO | 8103360 A1 | 11/1981 |

\* cited by examiner

HIGH LENGTH ISOTOPES SEPARATION COLUMN AND METHOD FOR ASSEMBLY

TECHNICAL FIELD

The present invention concerns the field of isotopic separation, and, specifically, methods based on separation by distillation in a very tall column, in particular the present invention describes an innovative conceived column built out of several modules connected in series, installed within and adapted to be supported by a mine shaft or adapted structure, this to obtain new technical results in the field.

BACKGROUND ART

Isotopes of a chemical element differ for the number of neutrons contained in a nucleus. The number of protons, and hence the number of electrons, is identical, and so are the chemical bounds of the isotopes. Isotopic separation must rely on the small difference in those chemo-physical properties that are affected by the difference in mass among isotopes.

Among the various methods in use for isotopic separation, continuous fractional distillation, typically carried out at cryogenic temperatures, hence often cited as cryogenic distillation, is a known art for the isotopic separation of atoms and molecules of light elements.

In the continuous fractional distillation process, feed (gas or liquid) is delivered to a distillation column under flow control; the distillation column is filled with distillation plates and/or structured packing (interleaved, when necessary, with liquid re-distribution plates), designed to maximize the contact between an upflowing vapor stream and a downflowing liquid stream. At the top of the column, a condenser cools and condenses the upflowing vapor stream, creating the downflowing liquid stream, which falls from top to bottom, under action of gravity; at the bottom of the column, the liquid stream is boiled in the reboiler, creating the upflowing vapor stream, which flows from the bottom to the top of the column, driven by the pressure differential created by the vapor condensation at the top condenser. The continuous fractional distillation process allows the separation of substances or of its components taking advantage of their selective evaporation. Substances with the lower vapor tension concentrate in the bottom of the column; substances with the higher vapor tension concentrate in the top condenser; slipstreams of the substances separated can be extracted during the process from the top condenser and from the bottom reboiler.

When in use for isotopic separation, the continuous fractional distillation process concentrates heavy isotopes, i.e., those characterized by a lower vapor pressure, in the bottom of the column; and light isotopes, characterized by a higher vapor pressure, at the top of the column.

The most important parameter determining the isotopic rate of separation and purity achievable in a distillation column is the ratio of the vapor pressure of elements, $\alpha$ (T), dependent upon the temperature T of process operation. For isotopic separation via distillation, the ratio $\alpha$ is typically very close to unity (the number one), with the difference from unity, $(\alpha-1)$, very small, typically of the order of from a few parts per thousand to a few parts per tens of thousands, and practically constant within the small temperature range of operation of the column, generally chosen near the normal boiling point of the fluid.

The small difference $(\alpha-1)$ determines the minimum number of equilibrium stages required for efficient separation in a distillation column. The so-called "Fenske rule" indicates that the minimum number of stages required for effective separation scales as $1/\ln(\alpha) \approx 1/(\alpha-1)$: this implies that the desired number of equilibrium stages for isotopic separation is extremely large, ranging from several hundreds to several tens of thousands.

The small difference $(\alpha-1)$ also severely restricts the production rate and dictates the energy required for separation: the reflux ratio, defined as the ratio of the liquid mass flow rate in the column to the distillate mass flow rate, i.e., the ratio of the mass flow rate of vapors condensed at the top condenser and sent back into the column to the mass flow rate of vapors condensed at the top condenser and extracted as distillate fluid, for systems with a number of theoretical stages near the theoretical minimum set by the Fenske rule is also of the order of $1/\ln(\alpha)$ $1/(\alpha-1)$. This implies that the fraction of recondensed vapors that can be extracted as useful product is minimal; it also implies that large amounts of energy are required to recondense the vapor to form the very large downflowing liquid stream; it also implies that equally large amounts of energy are required to boil the liquid at the bottom of the column to create the very large upflowing vapor stream.

Therefore, for the effective use of fractional continuous cryogenic distillation, it is desirable the availability of extremely tall columns, with heights ranging from several hundreds to several thousands of meters, thus able to accommodate several thousands to several hundreds of thousands of equilibrium stages; it is desirable the availability of columns of very large diameter, ranging from several tens of centimeters to several meters, able to support the required very large upflowing vapor stream and downflowing liquid stream without incurring in the problematic condition of "flooding" of the column, which inhibits the very effective equilibrium between the vapor and liquid phases required for efficient isotopic separation.

Please note that in the known prior art a cryogenic distillation column comprised at least an internal distillation column, self-supporting and insulated by passive insulation material or within a cryostat, i.e., a self-supporting vessel operated under vacuum with the internal process column wrapped in multi-layer insulation (MLI) to minimize heat transmission. It is impossible to build self-supportive columns apt for cryogenic distillation and reaching the required heights of several hundreds of meters or more.

The construction, commissioning, and operation of very tall columns, of diameters of up to several meters, requires switching the support to costly mechanical structures, whose cost scales much more rapidly with height than that of the column it supports. For this reason, the tallest known distillation columns do not exceed a height of 60-70 meters.

In addition, when reaching the required height of several hundred of meters thanks to the innovative art of this invention, the large swing between room and process operating temperature of the cryogenic distillation column is expected to result in a net thermal contraction of the column from a fraction of a meter to a few meters, all while the surrounding vessel is subject to more limited thermal expansion and or contraction due to the limited temperature swings in environmental temperature.

An example of prior art having the hereabove cited problems can be found in the description of document GB 525, 575 of 1940, which describes towers used in chemical processes, i.e., contact towers, dephlegmators and bubble towers, the weight of the tower is supported resiliently at spaced intervals throughout its height. The tower comprises a superposed series of bubble or contact supporting elements some or all of which are supported by springs at intervals through the height of the tower, directly or through outer casing sections. The tower is formed from uniform sections 2 of ferro-silicon. Pot ware or metal with conically flared ends carrying clamping rings secured by nuts and bolts, some of which are eye bolts and are engaged by hooks anchored on coil compression springs bearing on brackets on an external steel frame. Alternate sections have inward peripheral flanges engaged by outward peripheral flanges on inner contactor bubble elements. Furthermore, by the provision of resilient supporting means, distribution of the weight of the tower is rendered continuous in the event of expansions or contractions thereof due to fluctuating temperature conditions during use.

It appears immediately obvious to the skilled person that such an installation is very expensive, and the height cannot be increased indefinitely, such an installation could reach only a plausible height of 100 meters being furthermore not insulated, which defies the fundamental purpose of this invention of operating the column as a cryogenic distillation column. Also, the method of support of the column via springs would not enable the compensation of expansion or contraction of the column for up to a few meters as required for operation as a cryogenic distillation column.

Document EP 0913655 of 1999 describes a method of constructing an elongate inner structure of large dimensions, surrounded by an outer structure, said inner structure being a fluid containment structure for forming at least a portion of a fluid supply installation, as declared by applicant itself: "The invention applies more particularly to the construction of air distillation columns, the height of which can reach 60 meters, surrounded by their supporting frameworks", so this being different with on and more object of the present invention and being a further example of the hereabove cited prior art limits. The invention has the object of proposing a method of constructing a large internal structure surrounded by an external structure, allowing on the one hand a quick assembly on site answering to the stress of verticality of the column, and also allowing a pre-assembly at a workshop before transport on site. The procedure uses modules, each made from a section of an inner structure 1 enclosed in a section of an outer structure 5 and assembled on side to make a column of the required height. The inner and outer structures are fitted together by inserting each inner structure horizontally into an outer one, e.g. using a system of rollers 11 and rails 31, after which the two structures are fixed together to form a module.

Before separating these modules; for each module, the construction is completed by placing a protective sheet metal on the corresponding external structure section, except at least in the connection areas to the other modules; the inner structure is a distillation column; the outer structure is merely a support frame; the modules are successively assembled from the lower module to the upper module to erect the inner structure on site. It appears clear to the person skilled in the art that this is merely another example of construction of distillation columns having the drawbacks here before described, in particular there no mention of any thermal insulation is provided, no mention of any insulation vessel is provided, no mention of any insulation vessel apt for being operated under vacuum as a cryostat is provided, the height is of max 60 meters, and furthermore the column is built in the horizontal direction inside a support frame, which needs to be lifted in vertical position upon completion of the construction of the column. All these characteristics make this method useless for the objects of the present invention. In fact, the present invention requires a construction method apt to support construction of columns of many hundreds or thousands of meters; it requires the presence of supports already installed along the final vertical direction of positioning of the column, such as to permit the construction of the column already in the final vertical direction and in the final position where it will be commissioned and operated, by mounting in series the modules of the column on said supports. In some preferred embodiments the present invention is a cryogenic distillation column, requiring the presence of an insulation vessel operated as a cryostat under vacuum.

So it seems clear to a person skilled in the art that those documents cited above do not belong to the closest prior art, as the present invention concerns the use of fractional continuous cryogenic distillation of heights of several hundreds of meters as made possible by the innovative design and methods described in this document. The results achievable with the art detailed in the documents cited above are instead limited by the structural technical problems described above.

OBJECTS AND SUMMARY OF THE INVENTION

It is an object of the present invention to overcome the drawbacks of the background art.

In particular, it is an object of the present invention to improve the height and diameter of the distillation column in a substantially practical way.

Another object of the present invention is to describe a cryogenic distillation column.

In is another object of the present invention to describe a newly conceived distillation column for isotopic distillation to obtain new results in isotopic separation.

A further object of the present invention is to describe a newly conceived distillation column that permits to achieve said results with reasonable and affordable construction costs.

Another object of the present invention is to describe a newly conceived distillation column that is practical to build, whose modules can be built at a workshop and easily transported to the site, where they assembled in the final position (and disassembled if needed for maintenance or other reasons).

Another object of the present invention is to describe a newly conceived distillation column that can accommodate for its own thermal expansion or contraction and ensuing stress.

So another object of the present invention is to describe a newly conceived distillation column that is practical to repair in case of damages, which can be easily accessed and whose constitutive elements can be easily substituted.

Another object of the present invention is to improve the energy performance of the distillation.

Finally, another object of the present invention is to describe a newly conceived distillation column that permits to obtain isotopes by cryogenic distillation with more affordable costs.

This and further objects of the present invention will be advantageously realized by the construction of an innovative column for isotopic distillation that comprises at least a large number of separated modules, said modules can be less or more tall; in particular in a very innovative way the object of the present invention is of describe an innovative cryogenic distillation column and a method to assembly that column, comprising at least a bottom reboiler, a top condenser and a central column section, said central column section comprising at least one or more central modular element(s), said modular element(s) being connected to the wall of a supporting structure by means of connecting means, said column being characterized in that one or a plurality of modules comprise at least one more bellows for compensating for thermal expansion or contraction of said column modules by contraction or expansion of the bellows along the total height of the column.

In a further preferred embodiment, said module(s) are surrounded by insulating material.

In a further preferred embodiment, said module(s) comprise at least an insulation vessel element and at least one internal modular column element enclosed within said vessel element. The volume between the thermal insulation vessel and the internal column element is either kept under vacuum with the column element wrapped by multi-layer insulation or can be filled with insulating material as used for the operation of the column for cryogenic distillation, so that heat transmission is minimized and impact of the large temperature variation of the internal modular elements on the external vessel elements is minimized. So the innovative modular distillation column can operate at cryogenic temperature as a cryogenic distillation column.

In a preferred embodiment of the present invention, also one or more of said external insulation vessel elements comprises bellows, that is a section of the vessel is replaced by one or more bellows, to compensate for the thermal expansion or contraction induced by the variation in the environmental temperature, such as to maintain the total height of the external insulation vessel between its top and bottom support constant. The presence of bellows in the external insulation vessel also ensures that the weight of each individual module is transferred to the corresponding individual support of the supporting structure.

In a further preferred embodiment of the present invention at least an insulation vessel contains multiple distillation column elements, and these columns work in parallel and/or are connected in series.

So in a particularly preferred embodiment said at least one internal column element is structurally connected at least to an external vessel element in one or no point by means of a fixed connection but parts of the column and vessel other than this connection are released and are free to mutually slide in the axial direction. So, when the at least one internal column element during process operation is subject to a significant thermal expansion or contraction in the vertical direction, the external vessel does not suffer mechanical stress due to this expansion or contraction of the internal column element.

In particular, in some preferred embodiment, said at least one external vessel element and said at least one internal column element are connected in one or no point by means of a fixed connection and in one or more points by means of sliding joints, sliding rest posts, chain links, or other means that permit limited and minimal adjustments of the positioning of the internal column elements with respect to the external vessel element in the axial directions, the parts of the at least one vessel and internal column element not connected by fixed means so being free to slide in the axial direction to compensate locally, within the height of the module for thermal expansion or contraction of any of their parts.

Regarding the method for assembly this innovative cryogenic distillation column, in particular, in one preferred embodiment, the modules forming the column will be installed within a mine shaft, this being only a possible embodiment of the present invention: for the scope of the present invention also a supporting tower or a similar structure can be used, provided it is high enough can be used this without limiting the field of the present invention.

This invention permits to design and build columns of unprecedented dimensions, of height ranging from hundreds to thousands of meters, and diameter of several centimeters to several meters, mounted within a mine shaft or adapted structure and supported by said mine shaft/tower, preferably composed of a bottom reboiler, a top condenser, and a central column section advantageously realized by one or more innovative central modules.

In a very convenient way the mine shaft will serve as supporting structure said structure being in fact in a preferred embodiment of the present invention conveniently the supporting frame of the distillation column, such as to avoid the necessity of building a huge and unsustainably expensive structure above ground level; please note that in any case in further embodiments other similar supportive structures could be used to fix and support the modular elements of the innovative column for isotopic distillation in other locations, provided that those structures will be suitable to the scope of the present invention, this without limiting the field of the present invention.

So in the here preferred described embodiment, the several modules building the innovative column will be secured to the mine shaft walls to support the individual modules, such as to enable construction of columns with height of up to several thousands of meters, and diameters of up to several meters. Ideally, advantageously, the modules of the column will have each an individual height ranging from a few meters to a few tens of meters, so that they can be easily transported from the construction site, where they are built and tested, to the mine shaft, where they undergo the final assembly.

In this way the final assembly steps are conveniently minimized and consisting essentially in the sole connection between the series of modules, piled in series one onto the other within the mine shaft, the connection conveniently taking place only once the modules are installed in their final position. (One more way in which the modules can be assembled will be described here below, with reference to the detailed description of the drawings in relation with at least one preferred embodiment of the present invention).

The construction of the new modular column will result from the serial assembly of the modules, from the bottom to the top of the mine shaft.

Please note that obviously the realization of a distillation column for isotopes conceived in modular mode is not merely a division of a known distillation column in single modular elements, such columns as hereabove described being already known: in the present invention a large number of physical aspects have been considered to realize an innovative modular column which will solve all the described technical drawbacks.

So, upon reception at the site of assembly, the modules are lowered within the mine shaft by the use of a winze; they are brought in the position required for connection to the other modules already as part of the pre-ordained sequence; they are advantageously secured to the walls of the mine shaft and surrounding rocks for example by being first connected to a platform which is in turn secured to structural plates fixed to walls of a shaft or of a mine shaft, directly or through other structural elements, either by means of rock bolts or other type of connections to the walls of the shaft or to the rocks surroundings the wall of the shaft, including through tenon joints fixed into mortises recessed into the walls of the shaft or rocks.

So the weight of any module is transferred to the mine shaft and surrounding rocks when said module is placed in their final position; and only then the module is connected by welds or flanged connections to the already installed modules, progressing in series in the construction of the tall distillation column.

So some of the innovative conceived elements introduced in this invention are: the new connection of the column elements to the shaft walls, for securing the structural support of each module directly by the mine shaft walls and the surrounding rocks; the presence, in the body of each module, of expandable/contractible sections, innovatively realized by the introduction of bellows or other expandable/contractible materials, able to compensate for the significant vertical thermal expansion or contraction that the column can incur into during the cycles of construction, commissioning, and, especially, operation: for columns of hundreds of meters of height that undergo a thermal transition between room temperature and cryogenic temperature of up to 300 Kelvin, expansion and contraction of the non-expandable/contractible sections can reach several meters, which must be compensated by accommodations in length in the expandable/contractible sections. So, this appears to be very different with respect to GB 525,575, where the expansion or contraction of the distillation column is offset by the compression or elongation of springs that are connected to the supports of the columns itself. Instead, in the present invention, the expansion or contraction of the distillation column is compensated by the contraction or expansion of bellows that are intrinsically part of the modules of the distillation column (and of the surrounding insulation vessel), maintaining unchanged the total vertical length of the column between the two extreme supports at its top and bottom. The marked advantage of this invention is that the construction method is apt for construction of extremely tall columns. On the contrary, the method described in GB 525,575 is not apt for construction of columns of over 100 meters in height, because the cumulative deformation of the column, from top to bottom, when operating a column at cryogenic temperature, would cause contraction of the column of the order of a meter, which is impractical to compensate with springs. In particular, please note that given the specific arrangement in use for the springs in the invention described in GB 525,575, those springs are merely useful (with the limits and problems here above described) for compensating for thermal expansion when moving from room to process operating temperature, but they cannot be useful for compensating thermal contraction, this being instead a central problem addressed by the present invention as a distillation column, and more in particular a cryogenic distillation column, is particularly subject to thermal contraction when moving from room to process operating temperature.

So those and other already known problems here above described are solved by the present invention in particular thanks to the innovative use of bellows that will be further described later in the figures.

As known, mine shafts with a total vertical height of several hundred to several thousands of meters, and diameters of several meters, are readily available. The innovative conceived column and method described in the present invention permit to build distillation columns with unprecedented number of stages, by connecting in series a large number of said newly conceived modules, each supported by the mine shaft walls and surrounding rocks. The number of stages is directly proportional to the total height available, with each theoretical stage occupying from a few to a few tens of centimeters in height.

Advantageously, the total number of stages that can be achieved with this modular column ranges from several thousands to several hundreds of thousands of stages.

This new modular conceived column also gives the possibility of building columns elements with large diameters, ranging from tens of centimeters to several meters, which permits to improve substantially the rate of isotopic separation and the isotopic purity.

In one embodiment, a distillation column comprises a hollow body with an inner cylindrical wall filled with distillation plates and/or structured packing.

In one particularly preferred embodiment, the distillation column is surrounded by a thermal insulation layer.

The thermal insulation layer can be obtained, in one embodiment, by surrounding the distillation columns with a structural thermal insulation vessel.

In one embodiment, the gap between the inner surface of the thermal insulation vessel and the external surface of the distillation column is filled by insulating material.

In one embodiment said insulating material in particular is expanded perlite, that has an exceptional thermal insulation capacity and a very low thermal conductivity that is guaranteed at all temperatures, due to its high open porosity which also provides for extraordinary lightness. Thanks to the low cost, ease of installation, its incombustibility and the reduced tendency to retain moisture, it finds one of its major applications in the industrial sector in the cryogenic sector, where super-cooling gas performances are required, showing its countless advantages both in application and in use.

In one embodiment, the external surface of the internal distillation column is covered by multi-layer insulation and the volume between the inner surface of the thermal insulation vessel and the external surface of the distillation column is kept under vacuum, at pressures below $10^{-2}$ mbar, such as to operate the internal distillation column within a cryostat.

In one embodiment, advantageously the thermal insulation vessel contains multiple distillation column elements, and these columns may work in parallel and/or may be connected in series, tying the top of one column to the bottom of the following column by process lines, which are built either inside the thermal insulation vessel or outside the thermal insulation vessel, and in the latter case are provided with independent thermal insulation; in the parallel configuration, the columns may work in conjunction or independently from each other.

In one embodiment, the column is initially built of multiple vertical modular sections, which are in turn connected to the other vertical sections by flanges or by welded joints.

In one embodiment the modular thermal insulation vessel is built of multiple vertical sections, which are also in turn connected to the other vertical sections of the thermal insulation vessel by flanges or by welded joints.

In one advantageous embodiment, each or several of the vertical sections composing the internal column, or the combination of the internal column and the surrounding thermal insulation vessel, are equipped with one or multiple bellows, which allow to compensate for the significant thermal expansion or contraction in the vertical direction experienced by the column during the installation and especially during process operation.

It is also object of the present invention to improve the energy performance of the distillation by the innovative introduction of an economizing energy recovery loop; cooling power at the top condenser and heating power at the bottom reboiler are dispensed through two heat exchangers; there is a single closed loop containing a thermal exchange fluid, which is used, at the heat exchanger of the top condenser, as a refrigerant to provide the cooling power required to condense the upstream gas flow reaching the top condenser into liquid phase; and it is also used, at the heat exchanger of the bottom reboiler, as a heating fluid at the bottom reboiler to provide the heating power required to boil the liquid phase of the fluid undergoing distillation. Please note that the usage of a single fluid for thermal exchange is also new.

In one embodiment, the distillation is carried out at cryogenic temperature and the fluid serving as a refrigerant fluid at the condenser and as heating fluid at the reboiler is nitrogen: nitrogen is circulated from the reboiler to the condenser and from the condenser to the reboiler in a closed circuit; nitrogen is fed to the heat exchanger at the top condenser in liquid form, and evaporation of the liquid nitrogen within the heat exchanger provides the cooling power required to condense the upstream gaseous flow; a nitrogen recycle compressor raises the pressure of the gaseous nitrogen exhausted by the top condenser heat exchanger and sends is to the bottom reboiler; at the bottom reboiler, gaseous nitrogen enters the bottom condenser heat exchanger; at the bottom reboiler, the release of heating power by the pressurized nitrogen at once forces the boiling of the liquid reflux flow of the fluid undergoing distillation and forces the cooling of the nitrogen exchange fluid, which is condensed into the liquid phase; finally, such as to close the loop, the nitrogen liquefied within the heat exchanger of the bottom condenser is pumped, by a cryogenic pump, through a thermally insulated line, towards the top condenser heat exchanger.

In one embodiment, the thermally insulated line carrying the liquid nitrogen from the bottom to the top heat exchanger is contained within the column' thermal insulation vessel. In one embodiment, the thermally insulated line carrying the gaseous nitrogen from the top to the bottom heat exchanger is contained within the column' thermal insulation vessel. Please note that the usage of nitrogen as a single fluid for thermal exchange is also new.

In another new embodiment of the cryogenic distillation, the nitrogen is substituted, as refrigerant fluid, by an inert noble element, such as argon, krypton, or xenon, which permits to extend the range of the operative used temperatures, this simply using in the same hydraulic circuit another element characterized by a different range of pressure-dependent temperatures for the phase transition between liquid and gas of said element. Please note that the usage of argon, krypton, or xenon, as a single fluid for thermal exchange is also new.

The here before cited unprecedented dimensions and height of the newly conceived modular column permits to reach the number of stages, ranging from several thousands to several hundreds of thousands, necessary for separation of the isotopes of argon and xenon. The difference from unity of the ratio of volatility, $(\alpha-1)$, for argon isotopes, such as $^{36}Ar$, $^{38}Ar$, $^{39}Ar$ and $^{40}Ar$, is of the order of a few parts per thousands. $^{40}Ar$ depleted in $^{39}Ar$ is of special interest as the target for very large scale, several tons to several hundreds of tons, dark matter searches. Due to the "Fenske rule" introduced before, the minimum number of stages required for the effective separation scales as $1/\ln(\alpha) \approx 1/(\alpha-1)$. This implies that the desired number of equilibrium stages for isotopic separation is extremely large, ranging from several hundreds to several tens of thousands.

Separation of argon isotopes requires operation within the cryogenic range of temperatures near the normal boiling point of argon, at 87 Kelvin, and operation of the distillation column within a cryostat. A minimal production rate of several kg/day of isotopically concentrated argon isotopes requires, due to the small values of $(\alpha-1)$, very large vapor flow rates, of the order of hundreds of normal $m^3$ per hour, and very large liquid flow rates, of the orders of several $m^3$ per hour. The desired vapor and liquid flow rates can be achieved with columns of minimal diameters of several tens of centimeters, equipped with structured packing able to sustain the significant liquid and vapor flow rates while maintaining excellent vetting of the surfaces without creating a flooding condition. This can be achieved with packing having preferably a height equivalent of the theoretical plate (HETP) of 10-15 centimeters of more, and maximum liquid speed of a few $m^3/(m^2 \times hour)$. These considerations drive the choice for the minimal height of the internal column of a few hundreds of meters and for the minimal diameter of the internal column of a few tens of centimeters. The thermal insulation vessel, enclosing the superinsulation and several process lines, can easily reach a diameter of several tens of centimeters.

The use of a mine shaft for the installation of the cryogenic modular distillation column permits to achieve an even surpass the dimensions required for the application necessary for the production of argon isotopes. A modular cryogenic distillation column can be outfitted in an existing mine shaft to reach diameters of several meters, and heights up to several thousands of meters: this would make possible the use of the column even for the separation of xenon isotopes, whose values of $(\alpha-1)$ are of one order of magnitude lower than for the argon isotopes, of the order of a few parts per tens of thousands. $^{136}Xe$ depleted in other xenon isotopes is of special interest as the target for very large scale experiments, with targets of several tons to several hundreds of tons, for the search of the extremely rare and not yet observed nuclear decay mode known as "neutrinoless double beta decay".

The present inventions would make in a very advantageous way uniquely possible to separate in large quantities (greater than several kg/day) argon and xenon isotopes.

At the same time, the present invention would significantly enhance the ability to produce and make much more affordable the cost of light isotopes, whose production by cryogenic distillation in much smaller columns is already covered by prior art, including, but not limited to: $^{12}C$ and $^{13}C$, obtained by methods including, but not limited to, cryogenic distillation of CO; $^{14}N$ and $^{15}N$, obtained by methods including, but not limited to, cryogenic distillation of $N_2$, NO, and $NH_3$; $^{16}O$ and $^{18}O$, obtained by methods including, but not limited to, cryogenic distillation of $H_2O$, $O_2$, and NO.

As an example, a 300 meter of column height for 2,500 stages equivalent with a diameter of 30 cm would result in the abatement of $^{39}Ar$ in a $^{40}Ar$ stream by of a factor 10 per single pass at a rate of circa 10 kg/day; similarly, the same column would directly enrich $^{13}C$ at the isotopic fraction of 0.995 (99.5%) by distillation of CO at a rate of a fraction of kg/day; similarly, the same column would directly enrich $^{15}N$ and $^{18}O$ at the isotopic fraction of 0.995 (99.5%) by distillation of NO at a rate of a fraction of kg/day.

BRIEF DESCRIPTION OF THE DRAWINGS

This and more advantages obtained thanks to the here described innovative cryogenic modular column for isotopes distillation will be further described hereinafter with reference to non-limitative examples, which are provided for explanatory, non-limitative purposes in the accompanying drawings. These drawings illustrate different aspects and embodiments of this invention and, where appropriate, the structures, components, materials and/or similar elements are indicated in the different figures with similar reference numbers.

DETAILED DESCRIPTION OF THE INVENTION

Figure 1:
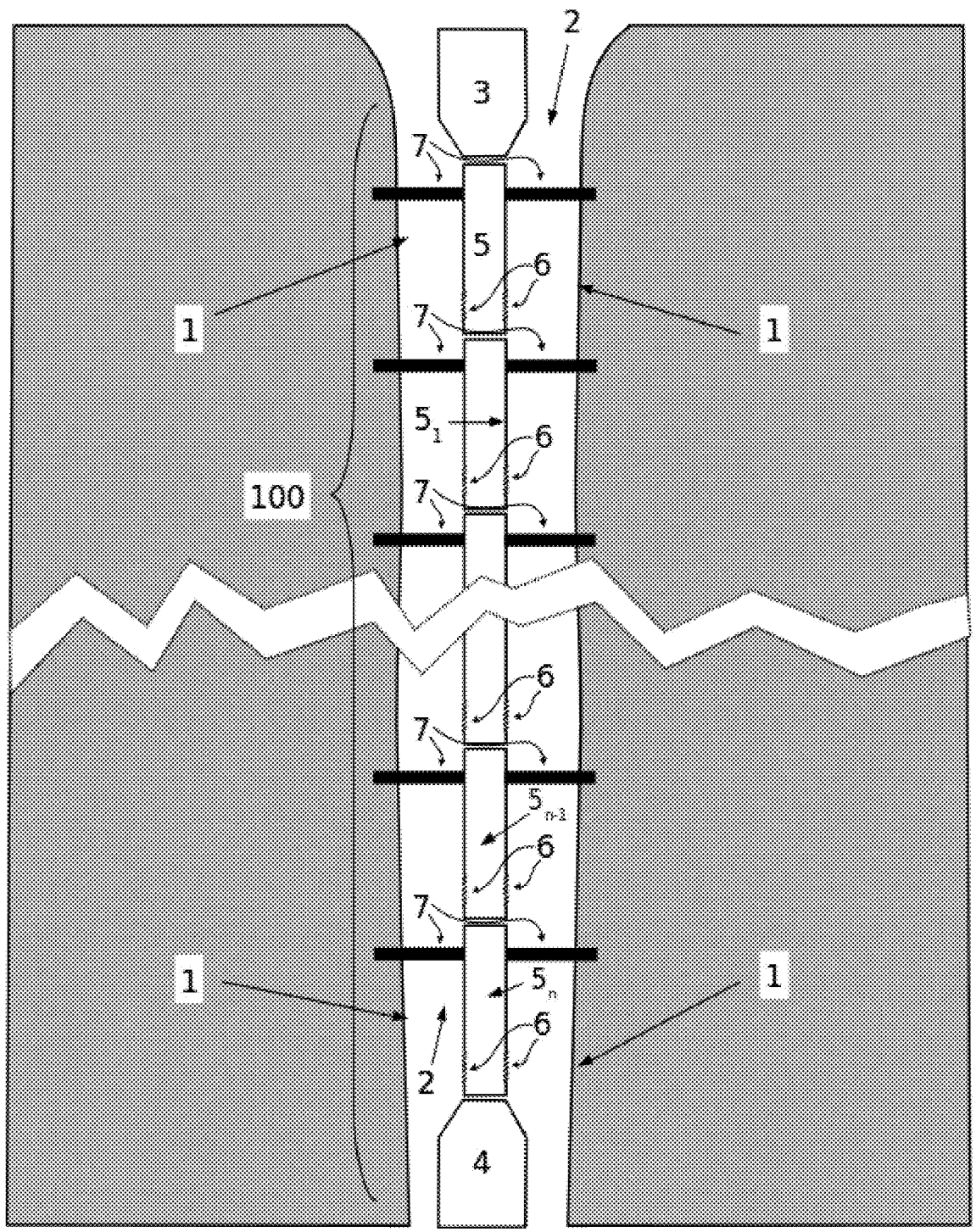
FIG. 1 illustrates a preferred embodiment of the modular distillation column installed within a mine shaft/supporting structure and supported by the lateral walls of the mine shaft/supporting structure according to the present invention.

While the invention is susceptible to various modifications and alternative constructions, some of the illustrated embodiments are shown in the drawings and will be described below in detail.

It must be understood, however, that there is no intention to limit the invention to the specific illustrated embodiments, but, on the contrary, the invention intends to cover all the modifications, alternative constructions and equivalents that fall within the scope of the invention as defined in the claims.

The use of "such as", "etc.", "or" indicates non-exclusive alternatives without limitations, unless otherwise indicated.

The use of "includes" means "includes, but is not limited to", unless otherwise indicated.

FIG. 1 illustrates a simplified preferred embodiment of the innovative modular distillation column 100 comprising a support system 7 installed in a mine shaft 2 delimited by the surrounding rocks 1. In this embodiment the complete distillation modular column 100 comprises a condenser 3 and a reboiler 4 and one or a plurality of central modules 5, . . . 5n. The central modules 5 are advantageously each equipped with one or more bellows 6 to compensate for the thermal expansion or contraction of the modular column 100 in the vertical direction due to the large swing between room and process operating temperature With this innovative construction, thanks to the bellows comprised in the modules, the final height of the column between the top and bottom supports always remains the same, irrespective of any large swings in temperature between room and process operating temperature, this because when one or more modules of the column are expanded by an increase in temperature, the variation in height is compensated by the contraction of bellows comprised in said module (or also in other modules), and when the modules are contracted by a decrease in temperature, the variation in height is compensated by expansion of the bellows, thus in a very advantageous maintaining the same height of the column and preserving its integrity across different operating conditions, all while, in a very innovative and advantageous way, allowing construction of columns of any needed height, even taller than 100 meters.

Some or all the vertical modules 5 are connected to the walls of the shaft. In one embodiment, the vertical modules 5 are attached to the walls of the shaft by a mechanical supporting system 7 comprising, for example, brackets or structural supports (shown in FIG. 3) which in turn are fixed to the shaft walls by rock bolts 31 or other type of connections to the walls of the shaft or to the rocks surroundings the wall of the shaft, including through tenon joints fixed into mortises recessed into the walls of the shaft or rocks.

Please note that in FIG. 1 it is represented a simplified embodiment of the present invention where the modular elements 5 are directly connected to the walls of the shaft.

In a further embodiment, the vertical modules 5 are mounted on platforms 29 providing local access to the column 100, which in turn are attached to the walls of the shaft by mechanical brackets, which in turn are fixed to the shaft walls by rock bolts 31 or other means as discussed above. The walls of the shaft may be bare rocks or may be covered with a layer of concrete, reinforced concrete or brick or other means suitable for that purpose.

In one embodiment, also the condenser and/or the reboiler are fixed to the walls of the shaft by mechanical brackets, which in turn are fixed to the shaft walls by rock bolts or other means.

In one embodiment, also the condenser and/or the reboiler are mounted on platforms, providing local access, which in turn are attached to the walls of the shaft by mechanical brackets, which in turn are fixed to the shaft walls by rock bolts or other means. In one embodiment, also the condenser and/or the reboiler contain a section with one or more bellows to compensate for thermal expansion or contraction of the column in the vertical direction.

The addition of a system of economizing heat exchangers can lower the costs of operation by recovering the enthalpy spent and gained at the reboiler and at the condenser. According to FIG. 2, in one embodiment, the distillation is carried out at cryogenic temperature and the thermal exchange fluid serving as a refrigerant fluid at the condenser and as heating fluid at the reboiler is nitrogen or a noble element such as argon or xenon. The thermal exchange fluid is fed as a liquid to the top condenser heat exchanger 11; the cooling power required by the top condenser heat exchanger 11 to condense the vapor stream of the fluid undergoing separation by distillation in the distillation column is provided by the phase transition of the thermal exchange fluid into a gas; the thermal exchange fluid gaseous stream exhausted by the top condenser heat exchanger 11 is compressed at high pressure by a gas compressor 12 and sent to the input of the bottom reboiler heat exchanger 13; the heating power required by the bottom reboiler heat exchanger 11 to boil the liquid stream of the fluid undergoing separation by distillation in the distillation column is provided by the phase transition of the thermal exchange fluid from a gas into a liquid; the thermal exchange fluid liquid stream resulting from the bottom condenser heat exchanger 13 is pumped via a cryogenic pump 14 towards the top condenser heat exchanger, such as to close the loop.

Figure 3:
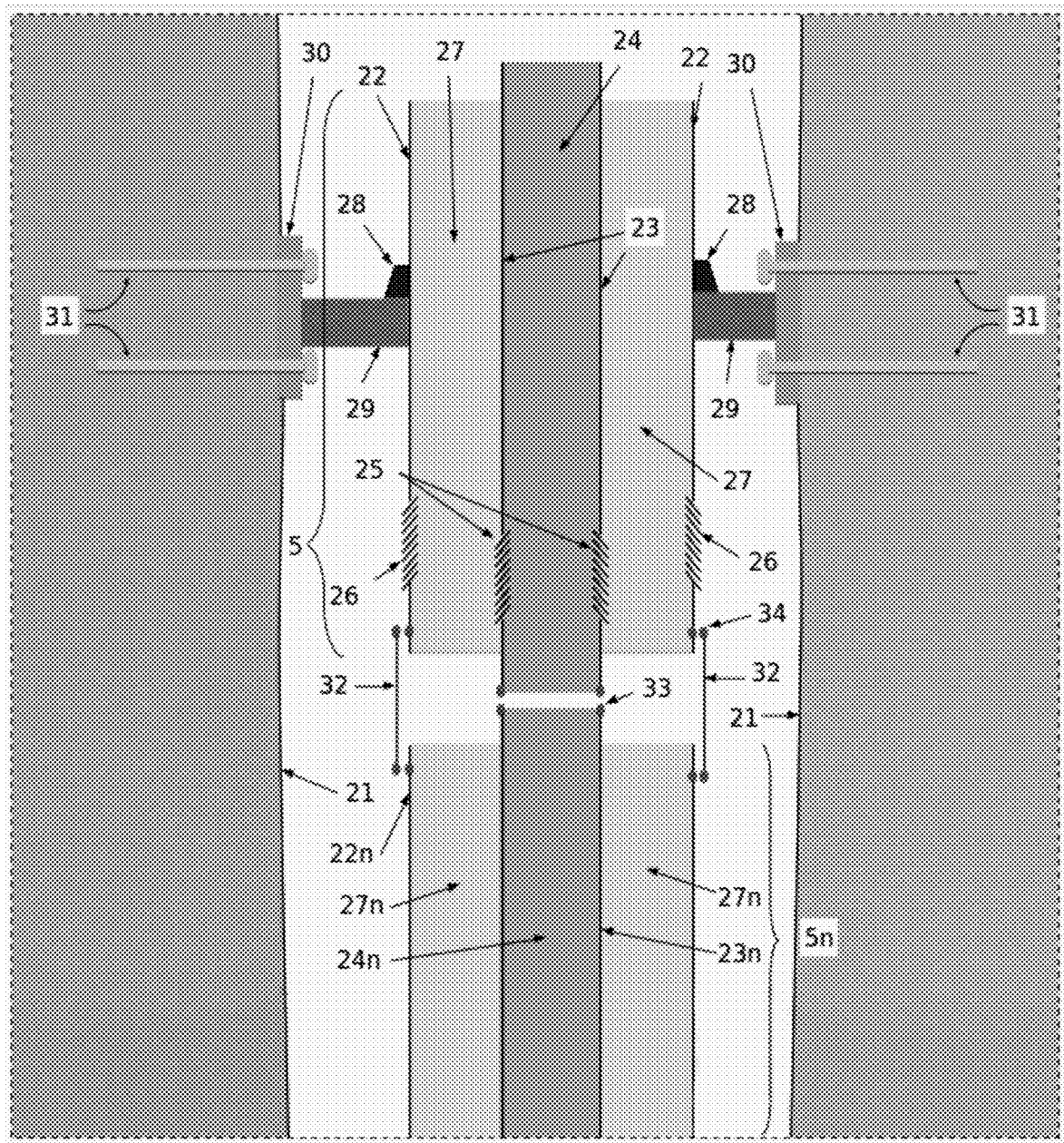
FIG. 3 illustrates a preferred embodiment of the individual modules of the column with reference to their connection and realization.

According to FIG. 3, in one embodiment, the individual modules 5 of the column 100 comprise at least one external thermal insulation vessel 22; and at least one internal column elements 23 wrapped in multi-layer insulation (not shown in FIG. 3) except for the final section dedicated to the welding to the other modules 5 (that section will be covered with multi-layer insulation in place after performing the welding, as described below); the gap volume 27 between the thermal insulation vessel 22 and the volume 24 of the internal column 23 is kept under vacuum; not shown are the structural supports connecting the thermal insulation vessel to the internal column.

Each of said modules or modular elements $5 \ldots 5_n$, in particular comprise at least an insulation vessel comprising vessel elements $22 \ldots 22_n$ enclosing internal column elements $23 \ldots 23_n$.

Please note that one insulation vessel 22 may comprise one or more internal column element 23, forming independent columns which can work together or independently from each other.

In a preferred embodiment of the present invention the internal volume 24 of the internal column 23 is the process volume, and it is filled with structured packing and/or distillation plates (interleaved, when necessary, with liquid distribution plates). A section of the thermal insulation vessel 22 is advantageously replaced by one or more bellows 26 to accommodate for thermal expansion or contraction; in the present embodiment a section of the internal column 23 is also replaced by a bellow 25 to compensate for thermal expansion or contraction. Please note that the bellows 25 play a crucial function for the internal central distillation column 23, which is subjected to the highest thermal excursions and therefore to the biggest expansion or contraction cycles, due to the large swing in temperature expected between the room and process operating temperature. Bellows 26 may be introduced also on the external insulation vessel 22 (as here represented), or not.

Figure 2:
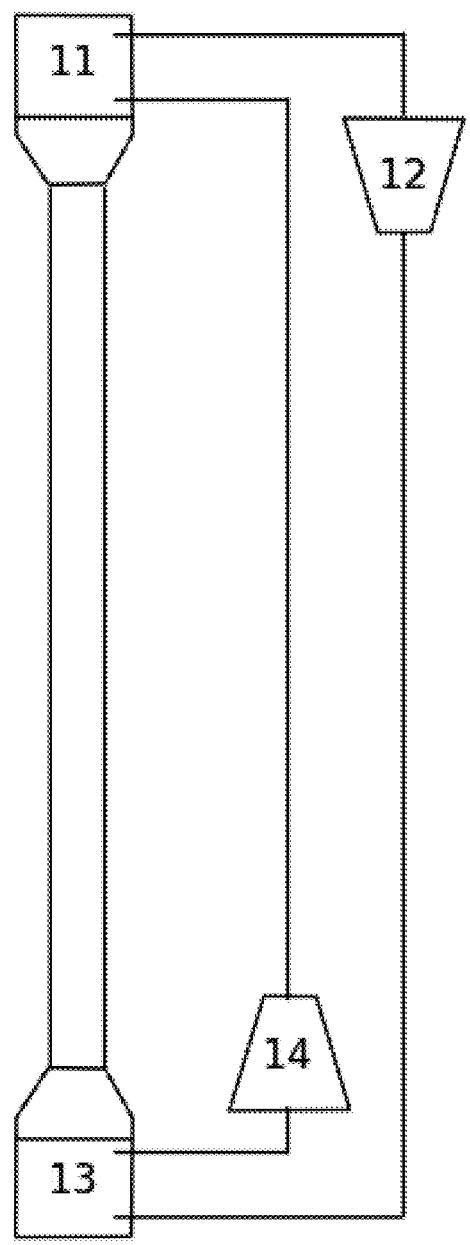
FIG. 2 illustrates a preferred embodiment of the modular distillation column with the inclusion of an economizing heat recovery loop according to the present invention.

In this regard it is noted that the volume 27 between the external thermal insulation vessel 22 and the internal distillation column 23 can be utilized to run service pipes, such as the two lines composing the closed loop of the thermal exchange fluid, running from the top to the bottom of the column, shown in FIG. 2, and also to house the column feed lines and sensors as necessary. In one preferred embodiment the bellows are introduced also on service pipes (here not represented) that are placed in the space 27 between the internal column 23 and the external insulation vessel 22, outside the internal column and inside the external insulation vessel.

The thermal insulation vessel 22 is coupled with structural supports 28, which are in turn connected to a platform 29, which is in turn secured to structural plates or supports 30, fixed to the walls of the mine shaft by rock bolts 31 or other type of connections to the walls of the shaft or to the rocks surroundings the wall of the shaft, including through tenon joints fixed into mortises recessed into the walls of the shaft or rocks.

In another embodiment the modular element 5 are directly connected to plates fixed to the mine shaft by rock bolts.

With the lowest modular element $5_n$ already in place, the module $5_{n-1}$ which is to be sited next to the lowest one is lowered into the shaft 21 and positioned so that the internal column section $23_{n-1}$ of the top module $5_{n-1}$ can be welded to the internal column section $23_n$ of the lowest module $5_n$, the weld spots identified by dots 33. (FIG. 3 represents a simplified embodiment, so there are shown only the modules $5_n$, 5 as examples.)

At this point, the multi-layer insulation (not represented), in use to reduce the transmission of heat via radiation, is wrapped around the section of the interior column not yet covered by the insulation vessel.

An external sleeve 32 was previously positioned around the external diameter of the bottom external thermal insulation vessel and is then raised in position and welded to the bottom $22_n$ and next to the bottom $22_{n-1}$ external thermal insulation vessel elements, to close the cryostat section with weld spots 34.

All the other interposed or subsequent modular elements $5_1 \ldots 5_{n-2}$ will be fixed in the same or a similar method, in reverse order from $5_{n-2}$ to $5_1$, till reaching the desired operative height of the modular column 100.

Please note that the modules could be fixed together also by other adapted methods or means, this being merely a not significant variation to the present invention; in the present embodiment welding has been considered the most secure way to fix those modules $5_n, 5_{n-1}, 5_{n-2}, \ldots 5_2, 5_1, 5$ in view of the significant mechanical stress to which the modular elements of the column 100 are anticipated to be subjected.

In any case please notice that is very easy and practical to couple together the modular elements $5_1 \ldots 5_n$ and in the same way it will be easy and practical to disassemble some modular elements if necessary, for maintenance, in case of damages, etc., this also being an advantage of the present invention as all the other here before described.

As specified, a very important and innovative aspect described by the present invention, which in fact permits to build and develop a column so tall as to obtain all the advantages described above, is the introduction al least of modules $5 \ldots 5_n$, one or more of said modules comprising at least one more bellows that can compensate for thermal expansion or contraction of the modules by contraction or expansion of the bellows.

In a preferred embodiment in particular said modules comprise modular vessel 22 and modular elements 23 of at least one distillation column, at least one of said modular elements 23 comprising one or more bellows.

Said at least one external vessel element 22 and said at least one internal column element 23 are connected in one or no point by means of a fixed connection and in one or more points by means of sliding joints, sliding rest posts, chain links, or other means that permit adjustments of the positioning of the internal column elements with respect to the external vessel element in the axial directions, the parts of the at least one vessel 22 and internal column element 23 not connected by fixed means so being free to slide in the axial direction to compensate locally, within the height of the module 5 for thermal expansion or contraction of any of their parts.

These and further objects of the present invention are achieved by means of the modular distillation column comprising the features of the annexed claims, which form an integral part of the present description.

So modifications in height or diameter of the modular elements, in the fixing means to the shaft, functional elements of the distillation modular column, number of fixing means, type of fixing means between the modules, are all to be considered only non-significant modifications of some realizations embodiment of the present invention and have to be considered covered by the object of the present invention as described above and better explicated with reference to the annexed claims.

REFERENCES

1. Casanova, C., Fieschi, R. & Terzi, N. Calculation of the vapour pressure ratio of Ne, A, Kr, and Xe isotopes in the solid state. Nuovo Cim. 18, 837-848 (1960).
2. Bigeleisen, J. Statistical Mechanics of Isotope Effects on the Thermodynamic Properties of Condensed Systems. J. Chem. Phys. 34, 1485-1493 (1961).
3. Boato, G., Casanova, G., Scoles, G. & Vallauri, M. E. Vapour pressure of isotopic liquids. Nuovo Cim. 20, 87-93 (1961).

4. Fieschi, R. & Terzi, N. Quantum effects in the liquid state by means of a phenomenological cell model: The vapour pressure ratio of Ne and Ar isotopes. Physica 27, 453-464 (1961).
5. Boato, G., Casanova, G. & Levi, A. Isotope Effect in Phase Equilibria. J. Chem. Phys. 37, 201-202 (1962).
6. Boato, G., Scoles, G. & Vallauri, M. E. Vapour pressure of isotopic solids by a steady flow method: Argon between 72° K and triple point. Nuovo Cim. 23, 1041-1053 (1962).
7. Ancona, E., Boato, G. & Casanova, G. Vapour pressure of isotopic liquids. Nuovo Cim. 24, 111-121 (1962).
8. Casanova, G., Levi, A. & Terzi, N. Mean square force in liquid argon and separation factor of isotopes. Physica 30, 937-947 (1964).
9. Rashid, K. & Krouse, H. R. Selenium isotopic fractionation during reduction to Se O and H 2Se. Can. J. Chem. 63, 3195-3199 (1985).
10. Mills, T. R. Practical Sulfur Isotope Separation by Distillation. Separ. Sci. Tech. 25, 1919-1930 (1990).
11. Calado, J. C. G., Dias, F. A., Lopes, J. N. C. & Rebelo, L. P. N. Vapor Pressure and Related Thermodynamic Properties of 36Ar. J. Phys. Chem. B 104, 8735-8742 (2000).
12. Chialvo, A. A. & Horita, J. Isotopic effect on phase equilibria of atomic fluids and their mixtures: A direct comparison between molecular simulation and experiment. J. Chem. Phys. 119, 4458-4467 (2003).
13. Canongia Lopes, J. N., Padua, A. A. H., Rebelo, L. P. N. & Bigeleisen, J. Calculation of vapor pressure isotope effects in the rare gases and their mixtures using an integral equation theory. J. Chem. Phys. 118, 5028-5037 (2003).
14. Gligan, M., Dulf, E., Unguresan, M.-L. & Festila, C. Preliminaries Regarding General Modeling of the Cryogenic Distillation with Application to ($^{13}$C) Iso-tope Separation. in 1, 155-158 (IEEE, 2006).
15. Oi, T. & Otsubo, A. Revisit to Vapor Pressure Isotope Effects of Water Studied by Molecular Orbital Calculations. J. Nucl. Sci. Tech. 47, 323-328 (2010).
16. Back, H. O. et al. Depleted Argon from Underground Sources. Phys. Procedia 37, 1105-1112 (2012).
17. Neaga, A. O. et al. A Simplified Mathematical Model Of The Cryogenic Distillation With Application To The $^{13}$C) Isotope Separation Column. AIP Conf. Proc. 1425, 189-192 (2012).
18. Dulf, E.-H., Pop, C.-I. & Dulf, F. Systematic Modeling Of The ($^{13}$C) Isotope Cryogenic Distillation Process. 47, 1234-1240 (2012).

What is claimed is:

1. A cryogenic distillation column for isotopic separation, comprising:
 at least one reboiler disposed along a bottom,
 a condenser disposed along a top, and
 a central distillation column section, said central distillation column section adapted to be connected to a wall of a supporting structure by means of connecting means between said central distillation column section comprising:
 at least one or more central modular element(s), said at least one or more central modular element(s) comprising:
 at least one external modular thermal insulation vessel element, and
 at least one internal modular column element enclosed within said at least one external modular thermal insulation vessel element, said at least one external modular thermal insulation vessel element conferring thermal insulation to said at least one internal module column element,
 an external sleeve positioned around an external diameter of a bottom external thermal insulation vessel of said at least one external modular thermal insulation vessel element, wherein the external sleeve is adapted to be raised in position to be welded to the bottom external thermal insulation vessel and to a next external modular thermal insulation vessel element of the bottom external thermal insulation vessel, to close a cryostat section with weld spots, and
 the at least one internal modular column elements) being insulated, except for a final section thereof dedicated to be coupled to a next internal modular column element of the at least one internal modular column element, wherein the final section is adapted to be covered with the multi-layer insulation in place, after the performing the welding, each of the at least one external modular thermal insulation vessel element and the at least one internal modular column element comprises one or more bellows, arranged there along for compensating for thermal expansion along a height of the each of the at least one external modular thermal insulation vessel element and the at least one internal modular column element by contraction or expansion of the one or more bellows along a total height of the cryogenic distillation column.

2. The cryogenic distillation column for isotopic separation according to claim 1, wherein said at least one external thermal modular insulation vessel element and said at least one internal modular column element are connected in one or no point by means of a fixed connection and in one or more points by means of sliding joints, sliding rest posts, chain links to permit adjustments of the positioning of the at least one internal modular column element with respect to the external modular thermal insulation vessel element in the axial directions, parts of the at least one external thermal insulation vessel element and the at least one internal modular column element not connected by fixed means so being free to slide in the axial direction to compensate locally, within the height of the module, for thermal expansion or contraction the parts thereof.

3. The cryogenic distillation column for isotopic separation according to claim 2, wherein volume between the at least one external modular thermal insulation vessel element(s) and the at least one internal modular column element is either operated under vacuum with the column element insulated by wrapping by a multi-layer insulation or being filled with insulating material to minimize heat transmission and impact of temperature variation of the at least one internal modular column elements on the at least one external modular thermal insulation vessel elements.

4. The cryogenic distillation column for isotopic separation according claim 3 further comprising: service pipes, and bellows introduced on the service pipes, wherein the bellows are placed in a space between the at least one internal modular column elements and the at least one external modular thermal insulation vessel element, outside the at least one internal modular column elements, and inside the at least one external modular thermal insulation vessel elements.

5. The cryogenic distillation column for isotopic separation according to claim 1 further comprising: an economizing heat exchanger operatively coupled to the reboiler and the condenser for lowering a cost of isotopic separation process by recovering the enthalpy spent and gained at the reboiler and the condenser.

6. The cryogenic distillation column for isotopic separation according to claim 1, wherein at least one of the external thermal insulation vessel element contains multiple internal module column elements connected either in parallel or in series.

7. The cryogenic distillation column for isotopic separation according to claim 6 further comprising a minimum number of stages for separation of isotopes of argon and xenon, given that for an effective separation the minimal number of stages is in inverse of a difference between unity (the number one) and the relative volatility of isotopes.

8. A method for assembly of the cryogenic distillation column comprising:
providing at least one or more central module element(s) comprising at least one or more external thermal insulation vessel elements ($22 \ldots 22_n$) surrounding at least one or more internal column elements ($23 \ldots 23_n$) jointly pre-assembled into the central module element(s), said central module element(s) having an individual height ranging from a meter to tens of meters, enabling said central module to be transported from a construction site, the modules then being sequentially assembled in place by being piled and connected in sequence, one onto the other within a mine shaft or a supporting structure, wherein sequentially assembling comprises:
coupling two adjacent external thermal insulation vessels of the at least one external modular thermal insulation vessel elements, wherein coupling the two adjacent external thermal insulation vessels comprises an external sleeve positioned around an external diameter of a bottom external thermal insulation vessel of said at least one external modular thermal insulation vessel element, wherein the external sleeve is adapted to be raised in position to be welded or coupled to the bottom external thermal insulation vessel and to a next external modular thermal insulation vessel element of the bottom external thermal insulation vessel, to close a cryostat section with weld spots;
coupling two adjacent internal modular column elements of the at least one internal column elements, wherein the coupling comprises the at least one internal modular column element(s) wrapped in a multi-layer insulation, except for a final section thereof dedicated to be coupled to a next internal modular column element of the at least one internal modular column element, wherein the final section is adapted to be covered with the multi-layer insulation in place, after the performing the welding;
each of the at least one external modular thermal insulation vessel element and the at least one internal modular column element comprises one or more bellows, arranged there along for compensating for thermal expansion along a height of the each of the at least one external modular thermal insulation vessel element and the at least one internal modular column element by contraction or expansion of the one or more bellows along a total height of the cryogenic distillation column.

9. The method according to claim 8, wherein said each of the at least one external modular thermal insulation vessel elements and the at least one internal column elements are first accommodated in final positions thereof and thereafter connected together with respective the next external modular thermal insulation vessel element and next internal modular column element by welding.

10. The method according to claim 8, wherein the at least one or more central modular element(s) are coupled with structural supports which are connected to a platform secured to structural plates fixed to walls of a shaft or of a mine shaft either by means of rock bolts or via connections to the walls of the shaft or to the rocks surroundings the wall of the shaft, wherein the connections including tenon joints fixed into mortises recessed into the walls of the shaft or rocks.

11. The method according to claim 8, wherein the at least one or more central modular element(s) is coupled with structural supports which are connected to a platform secured to an external support frame having a tall tower.

12. The method according to claim 8, further comprising a refrigerant fluid including argon, krypton, or xenon, to extend a range of process operating temperatures.

13. The method according to claim 9, wherein the at least one or more central modular element(s) are coupled with structural supports which are connected to a platform secured to structural plates fixed to walls of a shall or of a mine shall, either by means of rock bolts or via connections to the walls of the shaft or to the rocks surroundings the wall of the shaft, wherein the connections including tenon joints fixed into mortises recessed into the walls of the shaft or rocks.

* * * * *